US012377532B2

(12) United States Patent
Chen

(10) Patent No.: US 12,377,532 B2
(45) Date of Patent: Aug. 5, 2025

(54) TOOLBOX

(71) Applicant: MING SHIN TOOLS CO., LTD., Taichung (TW)

(72) Inventor: Yung-Shun Chen, Taichung (TW)

(73) Assignee: MING SHIN TOOLS CO., LTD., Taichung (TW)

( * ) Notice: Subject to any disclaimer, the term of this patent is extended or adjusted under 35 U.S.C. 154(b) by 55 days.

(21) Appl. No.: 18/397,602

(22) Filed: Dec. 27, 2023

(65) Prior Publication Data

US 2025/0214225 A1 Jul. 3, 2025

(51) Int. Cl.
*B25H 3/02* (2006.01)

(52) U.S. Cl.
CPC .................................... *B25H 3/028* (2013.01)

(58) Field of Classification Search
CPC .................................. B25H 3/028; B25H 3/00
USPC ................................ 206/349; 220/4.01, 4.07
See application file for complete search history.

(56) References Cited

U.S. PATENT DOCUMENTS 984,784 A * 2/1911 Tilton ................ B65D 21/0212 217/13
2002/0117944 A1* 8/2002 Chen .................. A47B 47/0075 312/249.11
2003/0155729 A1* 8/2003 Chen ...................... B25H 3/028 280/47.35
2022/0297283 A1* 9/2022 Chen ........................ B25H 3/02

* cited by examiner

*Primary Examiner* — Orlando E Aviles
*Assistant Examiner* — Sanjidul Islam
(74) *Attorney, Agent, or Firm* — MUNCY, GEISSLER, OLDS & LOWE, P.C.

(57) ABSTRACT

A toolbox is provided, wherein the toolbox includes: an upper wall; a bottom wall; two first side walls; a second side wall arranged between the upper wall and the bottom wall and transverse to and between the two first side walls; fastening assemblies each including a bolt and a nut; at least one storage drawer; wherein the fastening assemblies respectively clamp and secure the upper wall and each of the first side walls and clamp and secure the bottom wall and each of the first side walls, the upper wall, the bottom wall, the two first side walls and the second side wall define an accommodation space and an insertion opening and in communication with the accommodation space, and the at least one storage drawer is withdrawably inserted in the accommodation space via the insertion opening.

10 Claims, 7 Drawing Sheets

TOOLBOX

BACKGROUND OF THE INVENTION

Field of the Invention

The present invention relates to a storage device, and more particularly to a toolbox.

Description of the Prior Art

Generally, when fixing objects, drive tools (such as wrenches, sockets, screwdrivers or the like) are used to drive fasteners or connectors for assembling/disassembling. However, there are a variety of sizes and types of drive tools, so that toolboxes are often used for easy storage and carrying of the drive tools.

The conventional toolbox includes a plurality of plastic plates, the plurality of plastic plates are assembled by screws, which is advantageous for convenient and fast assembling. However, the screw is disposed through holes on the circumferential surface on one plastic and directly screwed to another plastic plate, so it results in a poor integrity and an unsightly appearance. In addition, no matter the portion of the plastic plate to which the screw is screwed is of a solid or hollow structure, it is easy to unscrew, detach or break, due to its low structural strength of the plastic material, when the toolbox is moved, dropped or subjected to external forces or impact.

The present invention is, therefore, arisen to obviate or at least mitigate the above-mentioned disadvantages.

SUMMARY OF THE INVENTION

The main object of the present invention is to provide a toolbox which is easy and quick to assemble, and has an extremely complete and beautiful appearance To achieve the above and other objects, a toolbox is provided, wherein the toolbox includes: an upper wall; a bottom wall arranged opposite to the upper wall; two first side walls arranged transverse to and between the upper wall and the bottom wall and facing each other; a second side wall arranged between the upper wall and the bottom wall and transverse to and between the two first side walls; a plurality of first fastening assemblies each including a first bolt and a first nut; a plurality of second fastening assemblies each including a second bolt and a second nut; at least one storage drawer; wherein one of the upper wall and each of the two first side walls includes a plurality of first through holes, and the other of the upper wall and each of the two first side walls includes a plurality of first receiving holes respectively corresponding to the plurality of first through holes; wherein one of the bottom wall and each of the two first side walls includes a plurality of second through holes, and the other of the bottom wall and each of the two first side walls includes a plurality of second receiving holes respectively corresponding to the plurality of second through holes; wherein each of the plurality of first receiving holes receives one said first nut, each said first bolt is blockably inserted in one said first through hole, extends in one said first receiving hole and is screwed to one said first nut, and the first bolt and the first nut of each of the plurality of first fastening assemblies respectively clamp and secure the upper wall and each of the two first side walls; wherein each of the plurality of second receiving holes receives one said second nut, each said second bolt is blockably inserted in one said second through hole, extends in one said second receiving hole and is screwed to one said second nut, and the second bolt and the second nut of each of the plurality of second fastening assemblies respectively clamp and secure the bottom wall and each of the two first side walls; wherein the upper wall, the bottom wall, the two first side walls and the second side wall define an accommodation space, and an insertion opening opposite to the second side wall and in communication with the accommodation space, and the at least one storage drawer is withdrawably inserted in the accommodation space via the insertion opening.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
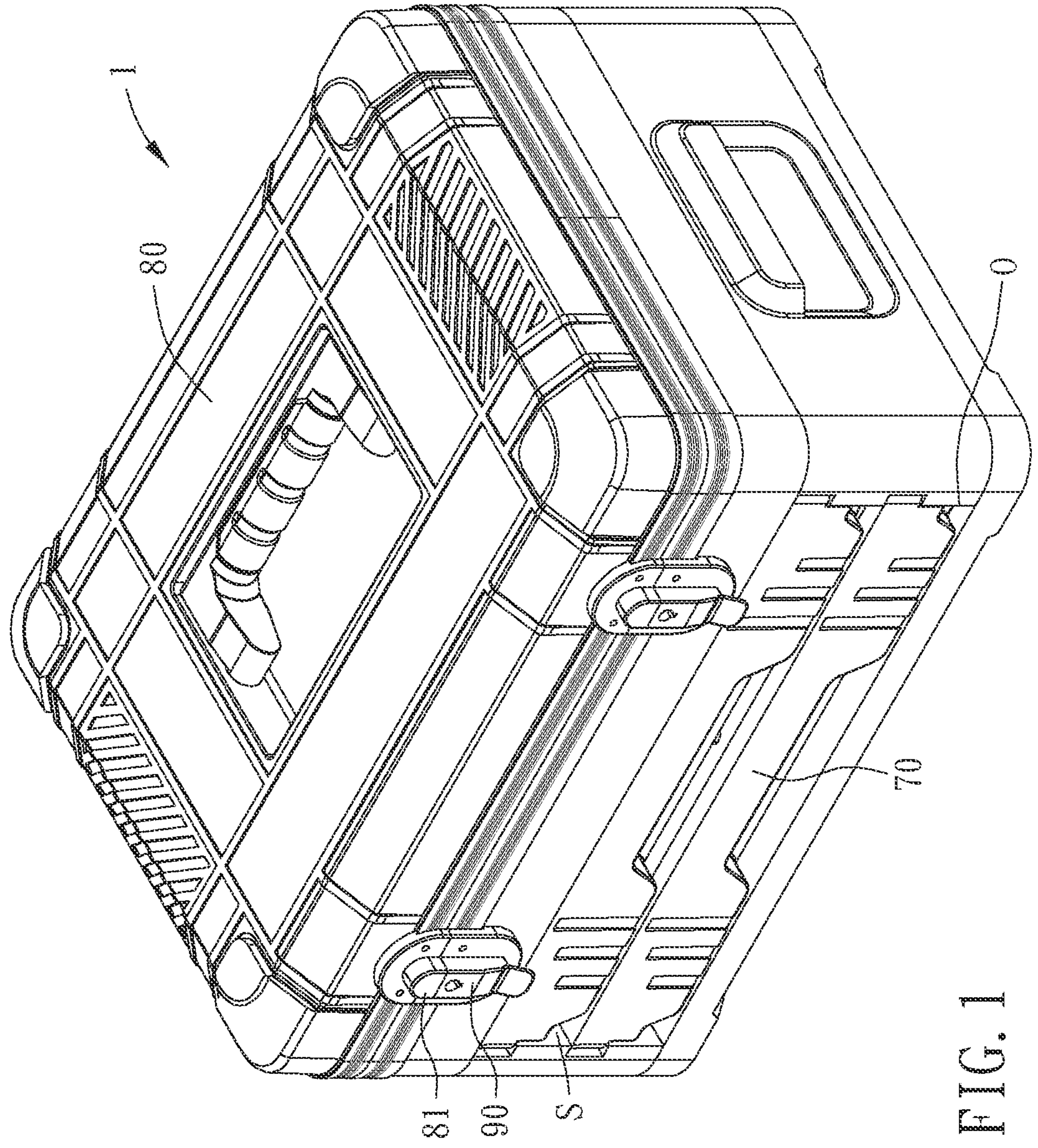
FIG. 1 is a stereogram of a toolbox in a close state according to an exemplary embodiment of the present invention.
Figure 2:
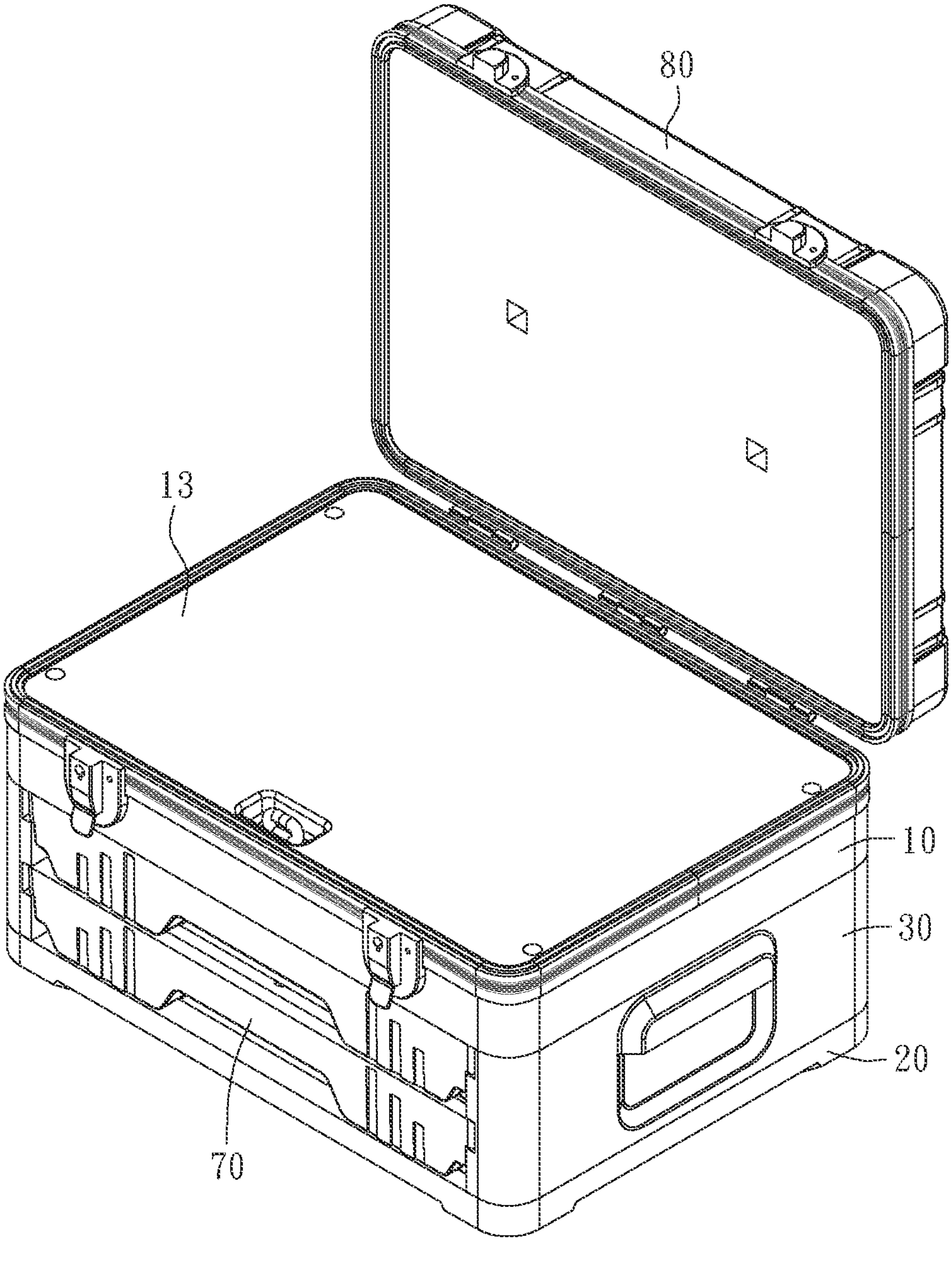
FIG. 2 is a stereogram of the toolbox in an open state according to an exemplary embodiment of the present invention.
Figure 3:
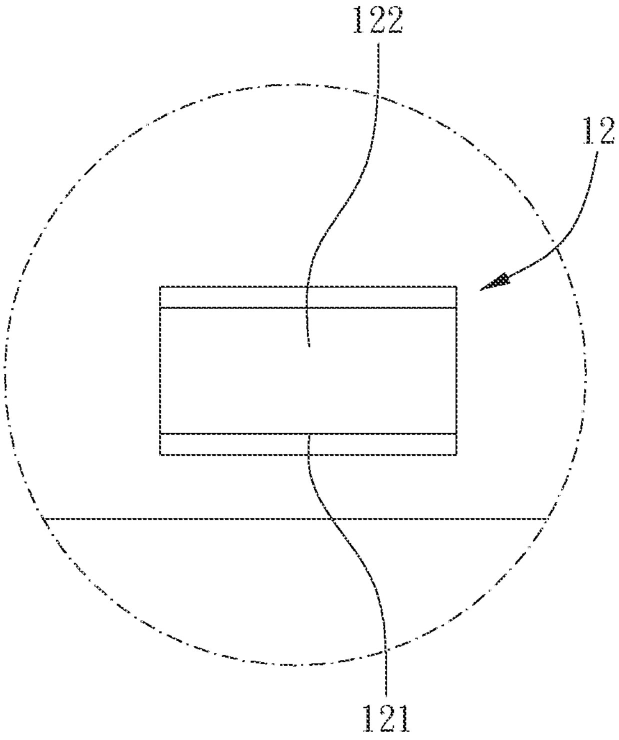
FIG. 3 is a partial enlargement of an upper wall according to an exemplary embodiment of the present invention.
Figure 4:
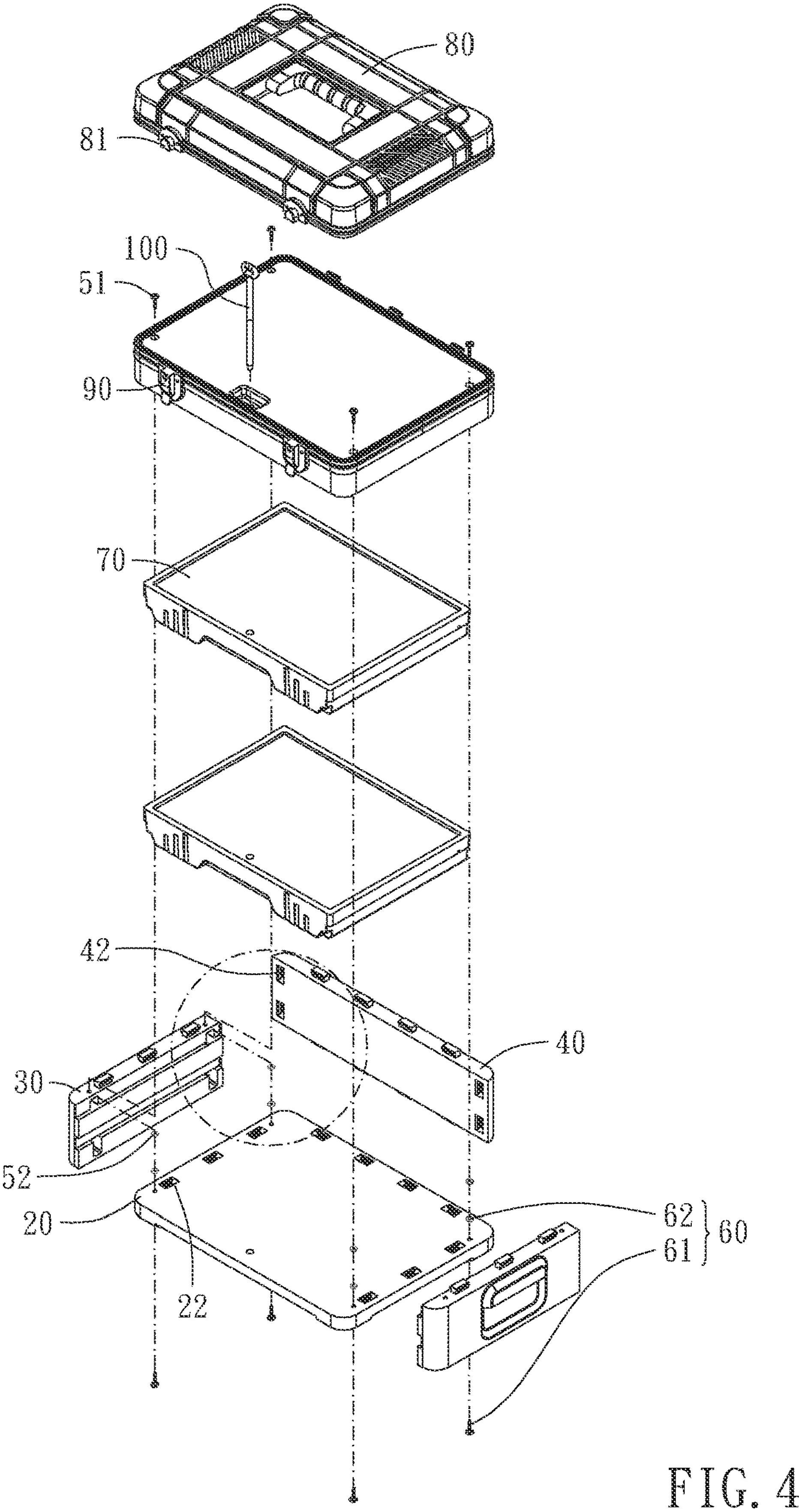
FIG. 4 is a breakdown drawing of an exemplary embodiment of the present invention.
Figure 5:
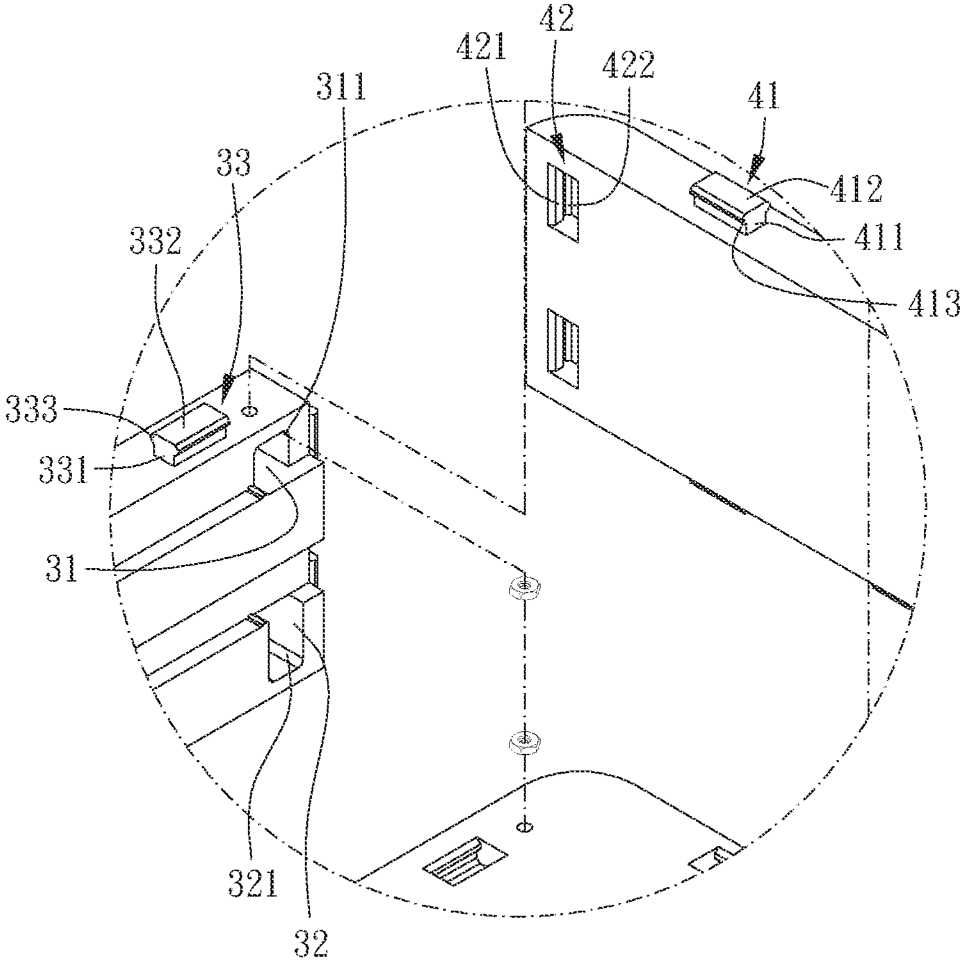
FIG. 5 is a partial enlargement of FIG. 4.
Figure 6:
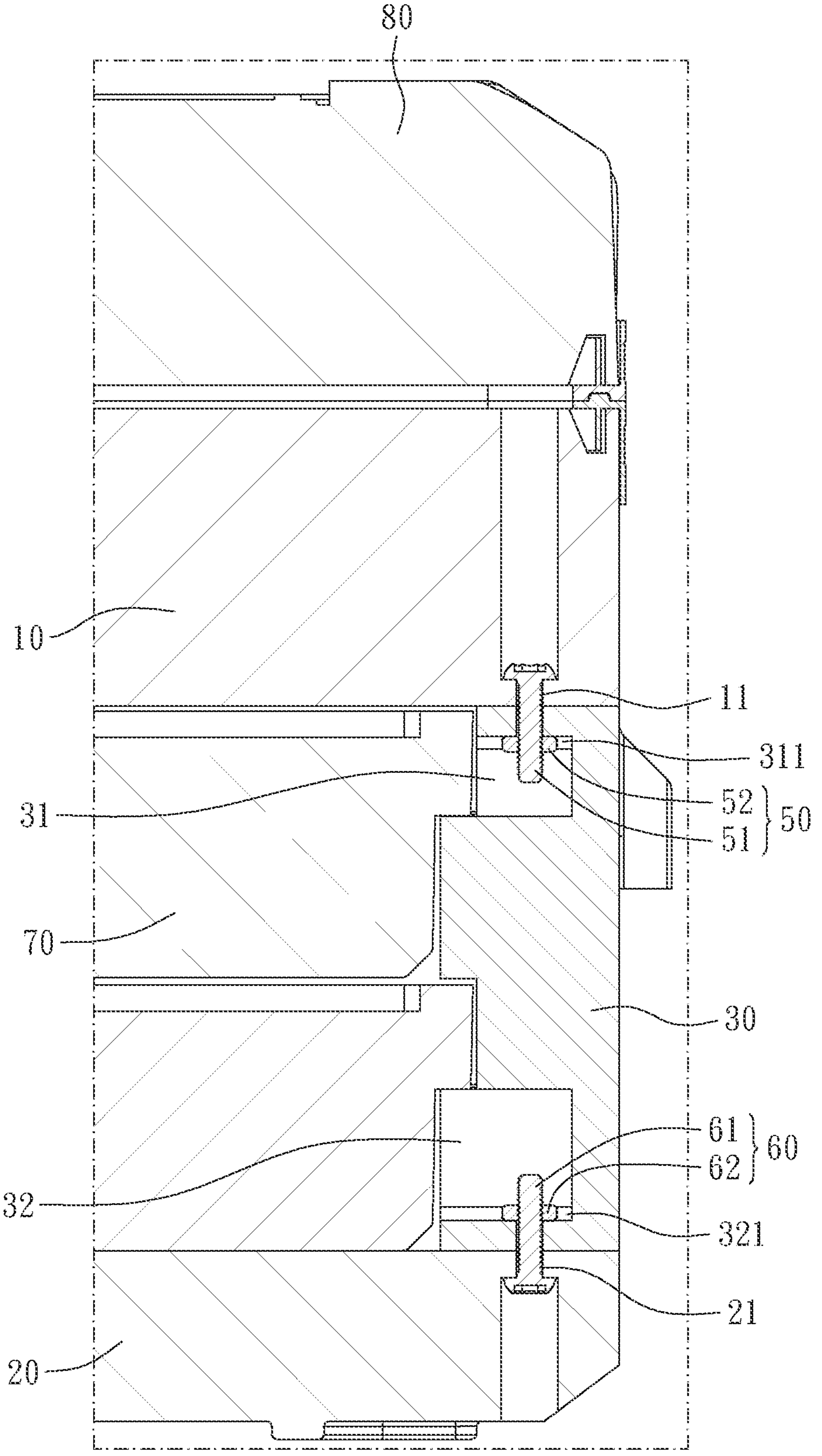
FIG. 6 is a partial cross-sectional view of an exemplary embodiment of the present invention.
Figure 7:
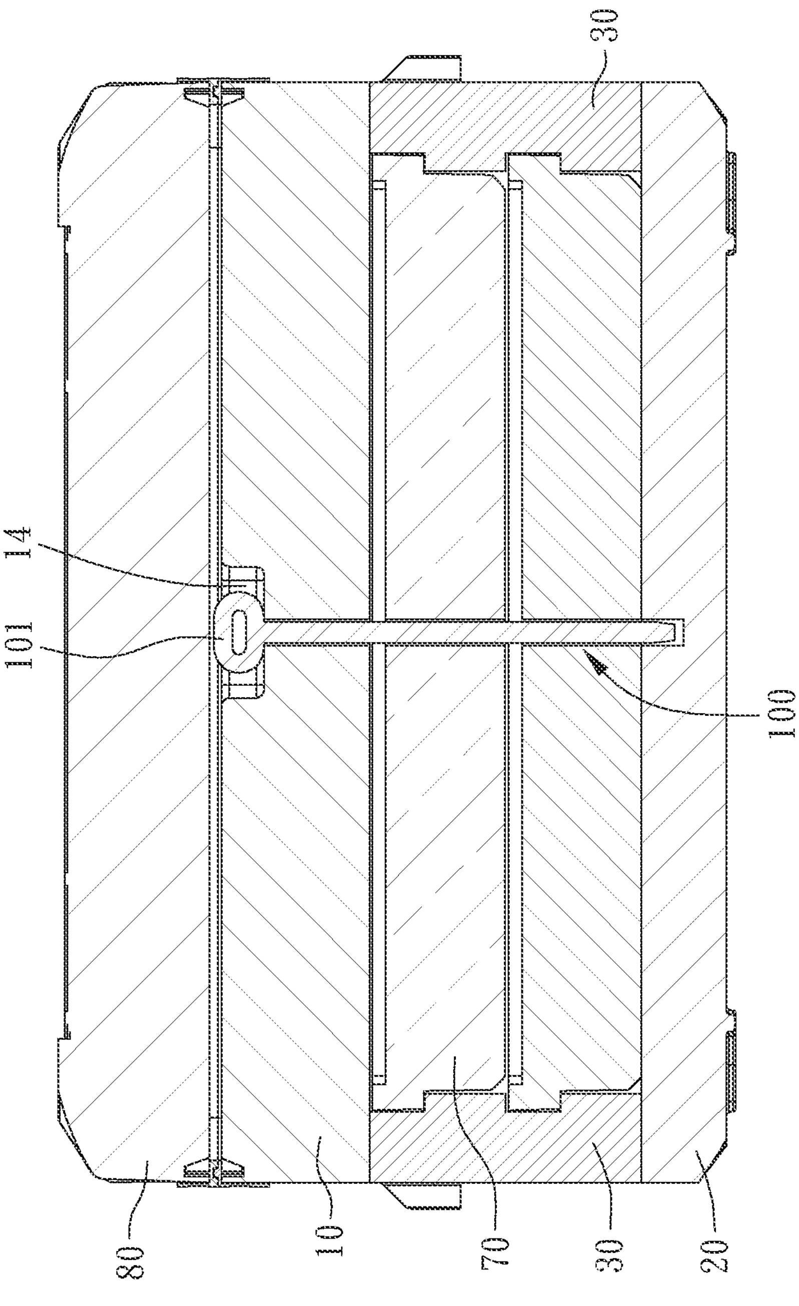
FIG. 7 is a cross-sectional view of an exemplary embodiment of the present invention.

Please refer to FIGS. 1 to 7 for an exemplary embodiment of the present invention. A toolbox 1 of the present invention includes an upper wall 10, a bottom wall 20, two first side walls 30, a second side wall 40, a plurality of first fastening assemblies 50, a plurality of second fastening assemblies 60 and at least one storage drawer 70.

The bottom wall 20 is arranged opposite to and above the upper wall 10. The two first side walls 30 are uprightly arranged, transverse to and between the upper wall 10 and the bottom wall 20, and face each other. The second side wall 40 uprightly arranged between the upper wall 10 and the bottom wall 20, and transverse to and between the two first side walls 30. Each of the plurality of first fastening assemblies 50 includes a first bolt 51 and a first nut 52. Each of the plurality of second fastening assemblies 60 includes a second bolt 61 and a second nut 62. One of the upper wall 10 and each of the two first side walls 30 includes a plurality of first through holes 11, the other of the upper wall 10 and each of the two first side walls 30 includes a plurality of first receiving holes 31 respectively corresponding to the plurality of first through holes 11. One of the bottom wall 20 and each of the two first side walls 30 includes a plurality of second through holes 21, the other of the bottom wall 20 and each of the two first side walls 30 includes a plurality of second receiving holes 32 respectively corresponding to the plurality of second through holes 21. Each of the plurality of first receiving holes 31 receives one said first nut 52, and each said first bolt 51 is blockably inserted in one said first through hole 11 and extends in one said first receiving hole 31 and is screwed to one said first nut 52. The first bolt 51 and the first nut 52 of each of the plurality of first fastening assemblies 50 respectively clamp and secure the upper wall 10 and each of the two first side walls 30. Each of the plurality of second receiving holes 32 receives one said second nut 62, and each said second bolt 61 is blockably inserted in one said second through hole 21, extends in one said second receiving hole 32 and is screwed to one said second nut 62. The second bolt 61 and second nut 62 of each of the plurality of second fastening assemblies 60 respectively clamp and secure the bottom wall 20 and each of the two first side walls 30. The upper wall 10, the bottom wall 20, the two first side walls 30 and the second side wall 40 define an accommodation space S and an insertion opening O opposite to the second side wall 40 and in communication with the accommodation space S, and the at least one storage drawer 70 is withdrawably inserted in the accommodation space S via the insertion opening O. Thereby, the toolbox 1 is easy and fast to assemble, and the toolbox 1 is locked in the up and down direction, so there is no need for the plurality of the first and second bolts 51, 61 to pass through holes on the circumferential surface of the toolbox 1. As such, it has good integrity, and the appearance is extremely complete and beautiful.

The upper wall 10 includes a plurality of connection recesses 12, the bottom wall 20 includes a plurality of connection recesses 22, each of the two first side walls 30 includes a plurality of connection projections 33, and the second side wall 40 includes a plurality of connection projections 41 and a plurality of connection recesses 42. The plurality of connection projections 33 of each of the two first side walls 30 are engaged in some of the plurality of connection recesses 12 of the upper wall 10, some of the plurality of connection recesses 22 of the bottom wall 20 and some of the plurality of connection recesses 42 of the second side wall 40. The plurality of connection projections 41 of the second side wall 40 are engaged in some of the plurality of connection recesses 12 of the upper wall 10 and some of the plurality of connection recesses 22 of the bottom wall 20. As such, the combination of the toolbox has excellent strength and can withstand large external forces or impacts, and the joint parts are not easy to loosen, separate or break.

In this embodiment, each connection projection is identical to one another and each connection recess is identical to one another, and therefore, the following connection projection and connection recess are taken as an example for expression; however, each connection projection may be different from one another, and each connection recess may be different from one another. For example, the connection projection 33, 41 of each of the two first side walls 30 and the second side wall 40 includes a necked portion 331, 411 and an enlarged end portion 332, 412 connected to the necked portion 331, 411, the upper wall 10, each of the plurality of connection recesses of the bottom wall 20 and the second side wall 40 includes a necked opening 121, 421 and an inner slot 122, 422 in communication with the necked opening, each said enlarged end portion 332, 412 urges and passes through one said necked opening 121, 421 and is blocked in one said inner slot 122, 422, and each said necked opening 121, 421 retains one said necked portion 331, 411. Each of opposing sides of each said enlarged end portion 332, 412 includes a lateral flange 333, 413. The cooperation of each said necked opening 121, 421 and the lateral flange 333, 413 can provide a better engagement of each of the connection projection 33, 41 and each connection recess.

In this embodiment, each of two corners of each of the plurality of first receiving holes 31 includes a first arcuate surface 311 whose height is larger than 0.5 times (0.75 times, 0.80 times, or a larger value, for example) a thickness of each said first nut 52, and a distance from a distal end of each said first bolt 51 to a hole wall of one said first receiving hole 31 is (1.5 times, 2.0 times, or a larger value, for example) larger than a diametric dimension of each said first bolt 51. Each of two corners of each of the plurality of second receiving holes 32 includes a second arcuate surface 321 whose height is larger than 0.5 times (0.75 times, 0.80 times, or a larger value, for example) a thickness of each said second nut 62, and a distance from a distal end of each said second bolt 61 to a hole wall of one said second receiving hole 32 is (1.5 times, 2.0 times, or a larger value, for example) larger than a diametric dimension of each said second bolt 61. Each said first arcuate surface 311 and each said second arcuate surface 321 can automatically guide and effectively restric each said first nut 52 and each said second nut 62.

Preferably, a top side of the upper wall 10 includes at least one tool storage space 13, and in addition to serving as the main side wall structure of the toolbox 1, the upper wall 10 also increases the capacity of receiving tools; the toolbox 1 further includes a lid 80, and the lid 80 is rotatably connected to a side of the upper wall 10, for covering the tool storage space 13; the upper wall 10 further includes at least one locking member 90 which is movable, the lid 80 includes at least one buckle 81, and the at least one locking member 90 and the at least one buckle 81 are releasably locked with each other, ensuring that the lid 80 will not be opened unexpectedly.

Preferably, the toolbox 1 further includes a pin member 100, the pin member 100 is removably inserted through the upper wall 10 and the at least one storage drawer 70, and an end of the pin member 100 is inserted in, which prevents the at least one storage drawer 70 from moving out of the accommodation space S, prevents tools from falling off, and has good safety. Preferably, a side of the upper wall 10 opposite to the bottom wall 20 includes a counterbore 14, another end of the pin member 100 includes a head portion 101, and the head portion 101 is blockably received in the counterbore 14, which is convenient to insert and remove the pin member 100, and the head portion 101 does not cause structural interference and disoperation.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A toolbox including:

an upper wall;

a bottom wall arranged opposite to the upper wall;

two first side walls arranged transverse to and between the upper wall and the bottom wall and facing each other;

a second side wall arranged between the upper wall and the bottom wall and transverse to and between the two first side walls;

a plurality of first fastening assemblies each including a first bolt and a first nut;

a plurality of second fastening assemblies each including a second bolt and a second nut;

at least one storage drawer;

wherein one of the upper wall and each of the two first side walls includes a plurality of first through holes, and the other of the upper wall and each of the two first side walls includes a plurality of first receiving holes respectively corresponding to the plurality of first through holes;

wherein one of the bottom wall and each of the two first side walls includes a plurality of second through holes, and the other of the bottom wall and each of the two first side walls includes a plurality of second receiving holes respectively corresponding to the plurality of second through holes;

wherein each of the plurality of first receiving holes receives one said first nut, each said first bolt is blockably inserted in one said first through hole, extends in one said first receiving hole and is screwed to one said first nut, and the first bolt and the first nut of each of the plurality of first fastening assemblies respectively clamp and secure the upper wall and each of the two first side walls;

wherein each of the plurality of second receiving holes receives one said second nut, each said second bolt is blockably inserted in one said second through hole, extends in one said second receiving hole and is screwed to one said second nut, and the second bolt and the second nut of each of the plurality of second fastening assemblies respectively clamp and secure the bottom wall and each of the two first side walls;

wherein the upper wall, the bottom wall, the two first side walls and the second side wall define an accommodation space, and an insertion opening opposite to the second side wall and in communication with the accommodation space, and the at least one storage drawer is withdrawably inserted in the accommodation space via the insertion opening.

2. The toolbox of claim 1, wherein a top side of the upper wall includes at least one tool storage space.

3. The toolbox of claim 1, wherein the upper wall includes a plurality of connection recesses, the bottom wall includes a plurality of connection recesses, each of the two first side walls includes a plurality of connection projections, the second side wall includes a plurality of connection projections and a plurality of connection recesses, the plurality of connection projections of each of the two first side walls are engaged in some of the plurality of connection recesses of the upper wall, some of the plurality of connection recesses of the bottom wall and some of the plurality of connection recesses of the second side wall, and the plurality of connection projections of the second side wall are engaged in some of the plurality of connection recesses of the upper wall and some of the plurality of connection recesses of the bottom wall.

4. The toolbox of claim 3, wherein each of the plurality of connection projections of the two first side walls and the second side wall includes a necked portion and an enlarged end portion connected to the necked portion, each of the plurality of connection recesses of the upper wall, the bottom wall and the second side wall includes a necked opening and an inner slot in communication with the necked opening, each said enlarged end portion urges and passes through one said necked opening and is blocked in one said inner slot, and each said necked opening retains one said necked portion.

5. The toolbox of claim 4, wherein each of opposing sides of each said enlarged end portion includes a lateral flange.

6. The toolbox of claim 1, wherein each of two corners of each of the plurality of first receiving holes includes a first arcuate surface whose height is larger than 0.5 times a thickness of each said first nut, and a distance from a distal end of each said first bolt to a hole wall of one said first receiving hole is larger than a diametric dimension of each said first bolt.

7. The toolbox of claim 1, wherein each of two corners of each of the plurality of second receiving holes includes a second arcuate surface whose height is larger than 0.5 times a thickness of each said second nut, and a distance from a distal end of each said second bolt to a hole wall of one said second receiving hole is larger than a diametric dimension of each said second bolt.

8. The toolbox of claim 5, wherein a top side of the upper wall includes at least one tool storage space; the toolbox further includes a lid, and the lid is rotatably connected to a side of the upper wall; the upper wall includes at least one locking member which is movable, the lid includes at least one buckle, and the at least one locking member and the at least one buckle are releasably locked with each other; each of two corners of each of the plurality of first receiving holes includes a first arcuate surface whose height is larger than 0.75 times a thickness of each said first nut, and a distance from a distal end of each said first bolt to a hole wall of one said first receiving hole is larger than 1.5 times a diametric dimension of each said first bolt; each of two corners of each of the plurality of second receiving holes includes a second arcuate surface whose height is larger than 0.75 times a thickness of each said second nut, and a distance from a distal end of each said second bolt to a hole wall of one said second receiving hole is larger than 1.5 times a diametric dimension of each said second bolt.

9. The toolbox of claim 1, further including a pin member, wherein the pin member is removably inserted through the upper wall and the at least one storage drawer, and an end of the pin member is inserted in the bottom wall.

10. The toolbox of claim 9, wherein a side of the upper wall opposite to the bottom wall includes a counterbore, another end of the pin member includes a head portion, and the head portion is blockably received in the counterbore.

* * * * *